US012164348B2

(12) United States Patent
Schoegler

(10) Patent No.: US 12,164,348 B2
(45) Date of Patent: Dec. 10, 2024

(54) CAPTURING OF ON-CHIP RESETS IN AN INTEGRATED CIRCUIT

(71) Applicant: NXP USA, Inc., Austin, TX (US)

(72) Inventor: Werner Schoegler, Graz (AT)

(73) Assignee: NXP USA, Inc., Austin, TX (US)

( * ) Notice: Subject to any disclaimer, the term of this patent is extended or adjusted under 35 U.S.C. 154(b) by 245 days.

(21) Appl. No.: 17/937,814

(22) Filed: Oct. 4, 2022

(65) Prior Publication Data

US 2024/0111345 A1    Apr. 4, 2024

(51) Int. Cl.
| | |
|---|---|
| G06F 15/177 | (2006.01) |
| G06F 1/24 | (2006.01) |
| G06F 9/445 | (2018.01) |
| G06F 15/78 | (2006.01) |

(52) U.S. Cl.
CPC ............ *G06F 1/24* (2013.01); *G06F 9/44505* (2013.01); *G06F 15/7807* (2013.01)

(58) Field of Classification Search
CPC ..... G06F 1/24; G06F 9/44505; G06F 15/7807
See application file for complete search history.

(56) References Cited

U.S. PATENT DOCUMENTS

| | | | | |
|---|---|---|---|---|
| 5,325,341 | A * | 6/1994 | Viot ........................ | G04F 10/04 713/502 |
| 8,122,291 | B2 | 2/2012 | Patel et al. | |
| 8,250,351 | B2 * | 8/2012 | Gilday ..................... | G06F 1/24 713/1 |
| 8,756,408 | B2 | 6/2014 | Lasch et al. | |
| 11,190,199 | B1 * | 11/2021 | Zheng .................... | H03M 1/468 |
| 2003/0028781 | A1 * | 2/2003 | Strongin .................. | G06F 9/24 712/E9.007 |

(Continued)

FOREIGN PATENT DOCUMENTS

| | | |
|---|---|---|
| CN | 1770106 A | 5/2006 |
| CN | 109408350 A | 3/2019 |

(Continued)

OTHER PUBLICATIONS

NXP Semiconductors: "MC33665A Data Sheet: Battery management communication gateway," Product short data sheet, Rev. 3—Jul. 29, 2022, Document identifier: MC33665A_SDS, Date of release: Jul. 29, 2022, pp. 1-9.

(Continued)

*Primary Examiner* — Kurtis R Bahr
(74) *Attorney, Agent, or Firm* — Joanna G. Geld

(57) ABSTRACT

A system includes a first reset capture register configured to receive a plurality of reset signals, a last reset capture register configured to receive the plurality of reset signals, and a reset control circuit. The reset control circuit is configured to perform a startup procedure in response to assertion of a first reset signal of the plurality of rest signals. The startup procedure beings with a start state and ends in an active state in which the system operates in normal operation, and the first reset signal is asserted while the system is in the active state. The first reset capture register is configured to capture a first state of the plurality of reset signals in response to assertion of the first reset signal, and the last reset capture register is configured to capture a final state of the plurality of reset signals prior to completing the startup procedure.

20 Claims, 5 Drawing Sheets

(56) References Cited

U.S. PATENT DOCUMENTS

| | | | |
|---|---|---|---|
| 2003/0065916 A1 | | 4/2003 | Erickson et al. |
| 2012/0210109 A1 | | 8/2012 | Lasch et al. |
| 2013/0145137 A1 | * | 6/2013 | Sartorius ............ G06F 11/1441 |
| | | | 713/1 |
| 2022/0149834 A1 | * | 5/2022 | Schoeffmann ............ G06F 1/28 |

FOREIGN PATENT DOCUMENTS

| | | |
|---|---|---|
| DE | 4409286 C1 | 8/1995 |
| DE | 10231955 A1 | 2/2003 |

OTHER PUBLICATIONS

NXP Semiconductors: "MC33775 Data Sheet: 14 cells battery cell controller IC," Preliminary short data sheet, Rev. 1—Feb. 4, 2022, Document identifier: MC33775A_SDS, Date of release: Feb. 4, 2022, pp. 1-10.

\* cited by examiner

CAPTURING OF ON-CHIP RESETS IN AN INTEGRATED CIRCUIT

BACKGROUND

Field

This disclosure relates generally to integrated circuits, and more specifically, to capturing on-chip resets within integrated circuits.

Related Art

Within systems that are built according to functional safety requirements, any anomaly of the system should be detected and available as diagnostic information, so as to better identify and correct problems within the system. For example, it is useful to provide diagnostic information for the reasons a system has reset. In general, there can be different reasons or conditions for reset, such as, over-voltage or under-voltage conditions, clock errors, high temperature conditions, built-in self-test (BIST) errors, watchdog errors, memory errors, configuration errors, and the like. Any of these reset reasons could be designed to trigger an on-chip global asynchronous reset of the system, during which no reliable clocks may be available and during which additional reset reasons could occur. Therefore, there is a need to provide information as to on-chip reset reasons, which may occur, for example, asynchronously during startup.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In one aspect, reset capture registers are used to asynchronously capture the state of on-chip resets during a system restart. The reset capture registers operate asynchronously because in many cases, no reliable clock is available at the time of occurrence of the reset or during startup. These reset capture registers include a first reset capture register which captures the reason that caused a first reset, in which this reason may be referred to as the root cause. The restart of the system can also be affected by further problems which can again cause resets, resulting in repeated restarts. For this reason, it also desirable to understand not only the root cause of the first reset, but also which resets happened afterwards during reboot of the system. Therefore, the reset capture registers also include a last reset capture register which captures the reason which caused the last (i.e. final) reset before the system has completed the startup (i.e. before the system has been released to normal operation mode after restart). In a further aspect, the reset capture registers may also include one or more additional reset capture registers to capture the sequence of resets during startup of the system which occur after the first reset and before the final reset. After a restart has completed, the contents of the reset capture registers can be stored within the system. In this manner, extended diagnostic information can be stored for detecting any anomaly in the system startup behavior, beyond just the root case cause.

Figure 1:
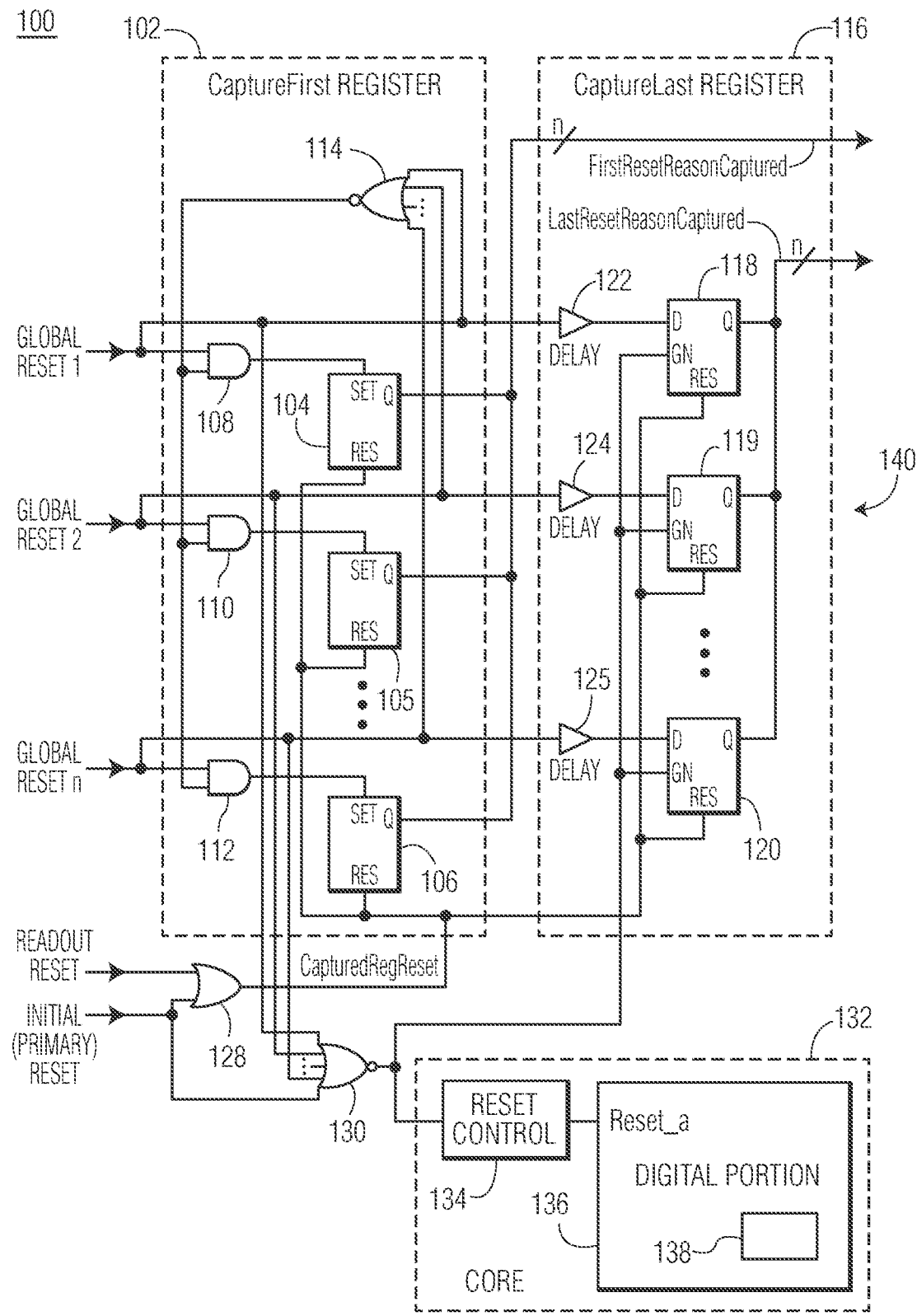
FIG. 1 illustrates, in partial block diagram and partial schematic form, an integrated circuit having a first reset capture register and a last reset capture register, in accordance with one embodiment of the present invention.

FIG. 1 illustrates an integrated circuit 100, which may also be referred to as a system-on-a-chip (SoC) 100 or as a system 100, in accordance with one embodiment of the present invention. System 100 includes N global resets, Global Reset 1-Global Reset N. N can be any integer value, depending on the number of global resets within the system. Each global reset can be caused by a corresponding reason, in which the corresponding reason can be an indication of a particular condition or error which results in generating the global reset. These reasons may include, for example, over-voltage or under-voltage conditions, clock errors, high temperature conditions, built-in self-test (BIST) errors, watchdog errors, memory errors, configuration errors, etc. For example, Global Reset 1 may be generated (i.e. asserted to a logic level one) when an over-voltage condition is detected by a voltage monitor of system 100. Global Reset 2 may be generated (i.e. asserted to a logic level one) when a high temperature condition is detected by a temperature monitor of system 100, corresponding to a detected temperature going above a predetermined temperature threshold. Global Reset 3 may be generated (i.e. asserted to a logic level one) when a BIST error is detected by BIST circuitry of system 100. Therefore, each of the N Global Resets may correspond to a different reason or condition which results in the generation of a global reset. In the current embodiments, when a global reset is generated, the global reset signal is asserted to a logic level one, and is negated to a logic level zero otherwise. As used herein, for each global reset signal, when the global reset signal is asserted at a logic level one, the global reset is considered to be active, and when the global reset signal is negated, the global reset is considered to be inactive or deactivated.

System 100 includes a set of reset capture registers 140, each capture register coupled to receive the N global resets, and a digital core 132. Reset capture registers 140 includes a first reset capture register, CaptureFirst register 102, configured to provide an N-bit FirstResetReasonCaptured output, and a last reset capture register, CaptureLast register 116, configured to provide an N-bit LastResetReasonCaptured output. These outputs can be provided to a digital portion 136 of core 132 which can process these outputs, such as by reading them and storing them into storage circuitry 138 (which can be implemented as a bank of registers or as a memory area in a Random Access Memory (RAM)). Reset control 134 includes circuitry which implements a startup procedure (illustrated as a state machine in the example of FIG. 3) and generate a specific reset signal, e.g., reset a, to digital portion 136 to properly reset the digital circuitry. Note that digital portion 136 can include all the digital circuitry of core 132 or only a portion thereof. Note also that core 132 or system 100 may include multiple digital portions which are controlled by specific reset signals from reset control 134 (these specific reset signals may also be referred to as local reset signals).

CaptureFirst register 102 includes N asynchronous flip flops (FFs), including FF 104, 105, 106. Each asynchronous FF includes an asynchronous SET input and an asynchronous RESET input and a data output Q. In operation, when the SET input is asserted to a logic level high, Q is asserted to a logic level high, and when the RESET input is asserted to a logic level high, Q is negated (or deasserted) to a logic level low. In the illustrated embodiment, when a rising edge (e.g. corresponding to a logic level one) is received at the SET input, Q is set to a logic level one, and when a rising edge (e.g. corresponding to a logic level one) is received at the RESET input, Q is cleared to a logic level zero. The output Q is not changed upon falling edges at either the SET or RESET inputs. Each asynchronous FF operates independent of any clock signal, therefore, CaptureFirst register 102 is an asynchronous register which operates to capture resets independent of any clock signal, as will be described in more detail below.

Each SET input of the N FFs (104, 105, . . . , 106) receives an output signal from a corresponding AND gate (108, 110, . . . , 112). Each of these AND gates receives a corresponding global reset signal at a first input, and an output of an N-input NOR gate 114 at a second input. Each input of the N-input NOR gate 114 is driven by a Q output of a corresponding asynchronous FF of CaptureFirst register 102. Therefore, each AND gate operates to gate or mask the corresponding global reset signal to the SET input of the corresponding asynchronous FF based on the output of NOR gate 114. For example, referring to Global Reset 1, Global Reset 1 is provided to the SET input of FF 104 when the output of NOR gate 114 is a logic level one, but is blocked (or masked) from providing a rising edge to the SET input of FF 104 when the output of NOR gate 114 is a logic level zero. This description applies analogously to each of the N global resets provided to each of the SET inputs of FFs 104-106. Therefore, while the output of NOR gate 114 is asserted at a logic level one, the asynchronous register is unlocked in that the values of the global reset signals are provided through the AND gates to the SET inputs of the asynchronous FFs, but once the output of NOR gate 114 is negated to a logic level zero, the value stored in the asynchronous register is locked (after a delay time of an AND gate) such that any further changes in the state of any of the global resets can no longer affect the values at the Q outputs.

As will be described in reference to the startup sequence in FIG. 3, upon an initial reset of system 100, a rising edge is provided via OR gate 128 as CaptureRegReset to each of the RESET inputs of FFs 104-106. Therefore, with FFs 104-106 outputting zeros to NOR gate 114, the output of XNOR 114 gate is initially a logic level one such that CaptureFirst register 102 begins in an unlocked state, and upon assertion of a first global reset signal, the output of the corresponding asynchronous FF is asserted to a logic level one which is fed back to NOR gate 114 causing the output of NOR gate 114 to transition to a logic level zero such that CaptureFirst register 102 enters a locked state. For this reason, the output of NOR gate 114 can be referred to as a lock indicator for CaptureFirst register 102. As used herein, an asynchronous register in a locked state may be referred to as a locked register or full register. When CaptureFirst register 102 is locked, the N-bit output value FirstResetReasonCaptured provides the reason (i.e. root cause) for the first global reset that occurs after entering active (i.e. normal) mode. For example, knowing which bit of the N-bit output value is asserted indicates which of the N global resets was asserted, and since each global reset is mapped to a particular reset reason, the corresponding reset reason is also known.

Note that the AND gates which provide their inputs to the N FFs 104-106 may be referred to as locking gates (or masking gates). The locking gates and NOR gate 114 may be referred to collectively as locking circuitry or masking circuitry for CaptureFirst register 102, and may be implemented with any type and number of logic gates. Also, the locking or masking circuitry may be considered to be part of the asynchronous register. Note that in alternate embodiments, different polarities may be used such that, for example, falling edges at the SET and RESET inputs assert or clear output Q rather than rising edges. Different logic may be used to implement the desired logic functions such as blocking the global resets from the SET input or determining when to lock the asynchronous register.

CaptureLast register 116 includes N asynchronous latches (latch 118, 119, . . . , 120). Each latch includes a data input D, a data output Q, a gating input GN, and a RESET input. In operation, when GN is set to a first logic level (e.g. logic level low), the latch is transparent such that the input D is simply provided as output Q and is not latched, but when GN transitions to a second logic level (e.g. logic level high), the very last value at input D during the previous GN input low phase is latched and provided at output Q. Note that output Q no longer changes based on the value of input D as long as GN remains high (in which latch is storing the previous value and is non-transparent). Each latch receives a corresponding global reset signal at its D input, receives the output of an N-input NOR gate 130 at its GN input, and receives CaptureRegReset at its RESET input. Therefore, just as with the asynchronous FFs of CaptureFirst register 102, the latches of CaptureLast register 116 are all reset to zero upon assertion of CaptureRegReset. NOR gate 130 receives the N Global Reset signals at its N inputs. The output of NOR gate 130 starts, upon reset, at a logic level one, and upon a first reset signal of the N Global Reset signals being asserted, the output of NOR gate 130, provided to the GN inputs, goes to a logic level zero. This results in the latches of CaptureLast register 116 operating transparently. While any of the global reset signals remains active (at a logic level one), the latches continue to be transparent. When all of the global reset signals are logic level zeros (i.e. inactive), though, the output of NOR gate 130 transitions to a logic level one, thus latching the values in CaptureLast register 116 as the N-bit value LastResetReasonCaptured. While GN remains at one, the latched value provided as Q does not change in response to input D.

In the illustrated embodiment, each of the N global resets is provided via a corresponding delay element (e.g. 122, 124, . . . , 126) to the D input of the corresponding latch. This allows CaptureLast register 116 to capture the last resets before all of the global resets were transitioned to low (corresponding to the inactive state). That is, when all the global resets are inactive, GN transitions to a logic level one which latches (i.e. captures) the values at the D inputs and provides them as the N-bit value, LastResetReasonCaptured. Due to the delay elements, this captured value provides the value at the D input just before the last global reset of the N global resets goes inactive. While GN is a logic level one, the values at the D inputs no longer affects the Q outputs. Therefore, upon the global reset signals propagating through the delay elements, the value of the LastResetReasonCaptured does not change since GN is a logic level one. As will be described below, the N-bit value of LastResetReasonCaptured is used to provide the reason for the last global reset which occurs prior to completing startup and entering normal mode again. Note the delay elements may be designed with any desired delay, to fulfill the hold timing requirements for latches 118, 119, and 120.

Upon entering active mode at the completion of startup, circuitry within digital portion 136 can store the values of FirstResetReasonCaptured and LastResetReasonCaptured into storage circuitry 138 as FirstResetReason and a LastResetReason, respectively. In one embodiment, each of these values is stored in an N-bit register of a register bank of storage circuitry 138. In this manner, these values can be stored while the set of capture registers 140 can be used for a next startup sequence. Once the values of FirstResetReasonCaptured and LastResetReasonCaptured are stored into storage circuitry 138, digital portion 136 asserts readout reset, which also results in the assertion of CaptureRegReset to reset all the FFs and latches back to zero. Therefore, OR gate 128 receives the Readout Reset signal and the initial (primary) reset as inputs, and provides CaptureRegReset at its output to all the RESET inputs of the FFs and latches. Operation of FIG. 1 will be described in more detail with respect to the state machine of FIG. 3 and the timing diagrams of FIGS. 4-6.

Figure 2:
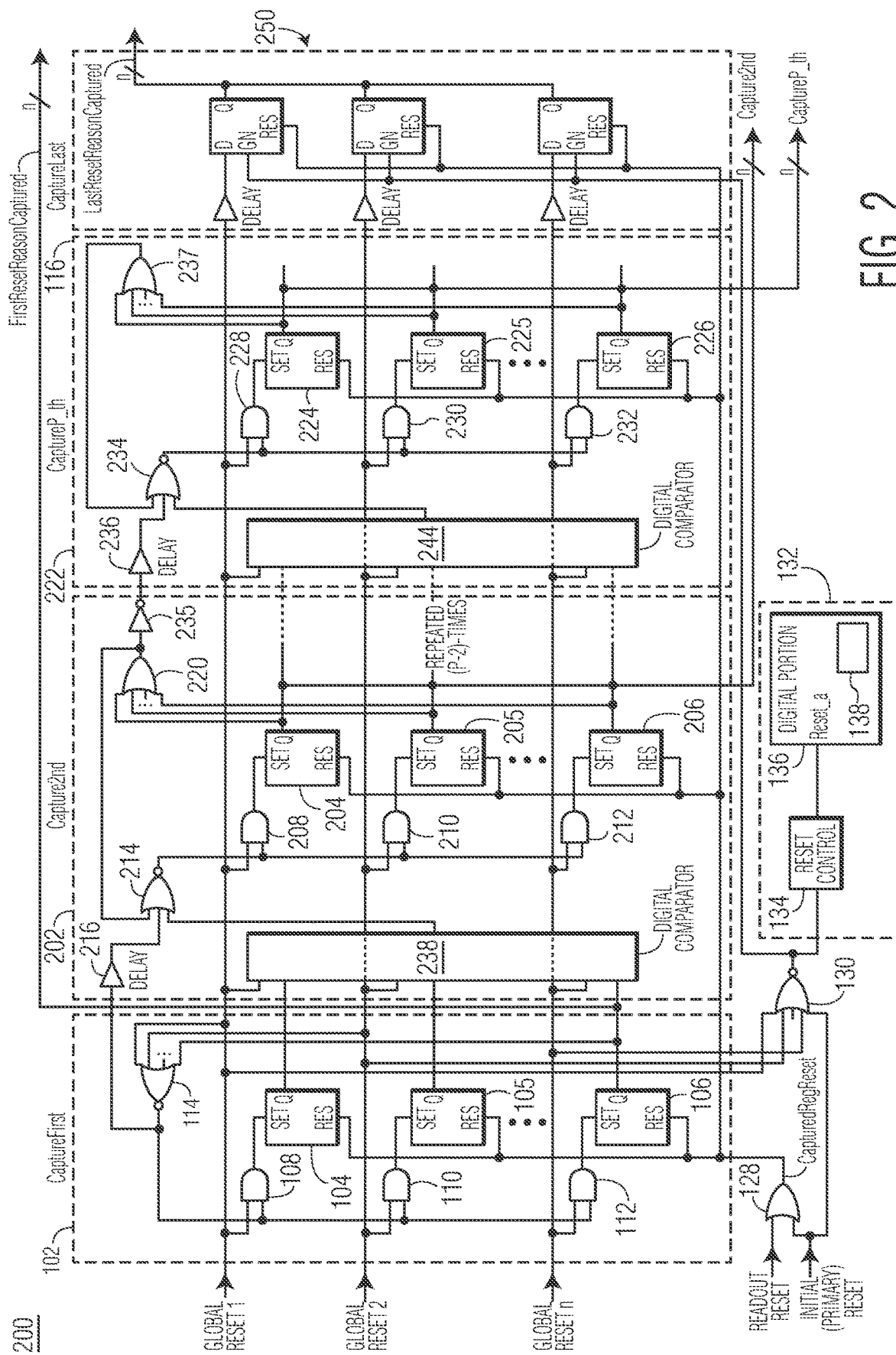
FIG. 2 illustrates, in partial block diagram and partial schematic form, an integrated circuit having the first and the last reset capture registers and at least one intermediate reset capture register, in accordance with one embodiment of the present invention.

FIG. 2 illustrates a system 200, which is similar to system 100, but includes additional capture registers, which may be referred to as intermediate capture registers. Note that like numerals and like names indicate like elements with system 100 such that the descriptions provided above for these elements in FIG. 1 also apply to these elements in FIG. 2. Referring to FIG. 2, system 200 includes a set of reset capture registers 250 which includes CaptureFirst register 102 and CaptureLast register 116 (as was described above in reference to FIG. 1), and also includes capture registers 2–P (Capture 2nd register 202 . . . Capture Pth register 222). As will be described, the CaptureFirst reset register and the intermediate reset capture registers are coupled in a manner which allows each to capture an N-bit value in turn (e.g., the CaptureFirst reset register captures an N-bit value first, followed by the Capture 2 nd register, the Capture 3rd register, the Capture 4th register, etc.). In this ordering, a subsequent reset capture register refers to the next unlocked reset register which will capture an N-bit value while a previous reset capture register refers to the reset capture register which most recently captured an N-bit value (the reset capture register which was most recently locked).

Each of the intermediate capture registers is an asynchronous register including N asynchronous FFs which, when locked, provides a corresponding captured N-bit output value (e.g. Capture2nd . . . Capture Pth). In one embodiment, an intermediate reset capture register is activated when a previous reset capture register is locked and the current reason for reset is different from the reason captured in the previous reset capture register. Therefore, note that each capture register from the CaptureFirst register 102 through each of capture registers 2–P, is locked in turn based on the N global resets. In this manner, CaptureFirst register 102, the intermediate capture registers (e.g. 202, 222), and CaptureLast register 116 provide the sequence of resets captured during startup, and since each reset is mapped to a particular condition or error, the sequence of reasons for the resets is also known. This will be described in more detail with respect to the timing diagrams of FIGS. 4-6. Note that P can be any value such that the set of capture registers 250 can include any number of intermediate capture registers in addition to the first and last capture registers. In one embodiment, P is selected to ensure that a maximum expected number of resets during startup can be captured.

In operation, referring first to Capture 2nd register 202 of FIG. 2, FFs 204-206 are analogous to FFs 104-106, respectively. Also, the locking gates (AND gates 208, 210, and 212) are analogous to the locking gates for CaptureFirst register 102 (AND gates 108, 110, and 112, respectively). Each AND gate for Capture 2nd register 202 has a first input coupled to receive a corresponding global reset signal of the N global resets, and a second input coupled to receive an output of a NOR gate 214.

A first input of NOR gate 214 receives an output of an N-bit OR gate 220, a second input of NOR gate 214 receives the output of NOR gate 114 (i.e. the lock indicator for the previous capture register, CaptureFirst register 102) via a delay element 216, and a third input of NOR gate 214 receives a difference indicator from an N-bit digital comparator 238. (Delay element 216 can be designed to be any delay value, as needed, and results in delaying the lock indicator from NOR gate 114.) The N global reset signals are provided to a first input of comparator 238 and outputs of the N FFs of the previous capture register (CaptureFirst register 102) are provided to a second input of comparator 238. When the values of the N global reset signals and the latched values in the N FFs of the previous capture register (e.g. Q outputs of FFs 104-106) are all the same, the output of comparator 238 is a logic level one, but when they are different (due to a change in the state of the N global reset signals), the output is a logic level zero. Therefore, when the previous capture register has locked (the output of NOR 114 is a logic level zero), and one of the global reset inputs has changed as compared to the captured value in the previous capture register, the output of NOR gate 214 is at a logic level one, activating Capture2nd register 202 such that the AND gates provide the corresponding global reset signal to the SET inputs of the corresponding FF of Capture2nd register 202. (Since each input of the N-input OR gate 220 is driven by a Q output of a corresponding asynchronous FF of Capture2nd register 202, upon activating Capture2nd register 202, the output of OR gate 220, and thus the first input to NOR gate 214, is still a logic level zero.) When the changed global reset is stored in Capture2nd register 202 (i.e. fed to the SET input of a corresponding FF by a corresponding AND gate), the output of one of FFs 204-206 will be a logic level one and the output of OR gate 220 will also be a logic level one. By applying that logic level one from the output of OR gate 220 to the first input of NOR gate 214, the output of NOR gate 214 becomes a logic level zero, thus locking Capture2nd register 202.

In this manner, OR gate 220, NOR gate 214, and the locking AND gates (208, 210, 212) may collectively be referred to as the locking circuitry to lock Capture 2nd register 202. OR gate 220 is coupled to the outputs of the FFs of Capture2nd register 202, and an output of OR gate 220 is provided via an inverter 235. The output of inverter 235, based on the outputs of the FFs of Caoture2nd register 202, provides a lock indicator to the next capture register. The same descriptions apply to each of the P–1 remaining intermediate capture registers, in which, for example, delay 236, NOR gate 234, N-bit digital comparator 244, the locking AND gates (228, 230, and 232), the asynchronous FFs (224, 225, 226), and OR gate 237 operate and are coupled analogous to delay 216, NOR gate 214, N-bit digital comparator 238, the locking AND gates (208, 210, 212), the asynchronous FFs (204, 205, and 206), and OR gate 220 as described in reference to Capture2nd register 202. CaptureLast register 116 operates as was described above in reference to FIG. 1, in which, each time all the N global resets are inactive, then the output of NOR gate 130 transitions to a logic level one, which triggers the latches of CaptureLast register 116 to latch current values at the D inputs as the Q outputs. While GN remains at a logic level one, the Q outputs have stored the previous value and the D inputs are prevented from affecting the Q outputs.

Figure 3:
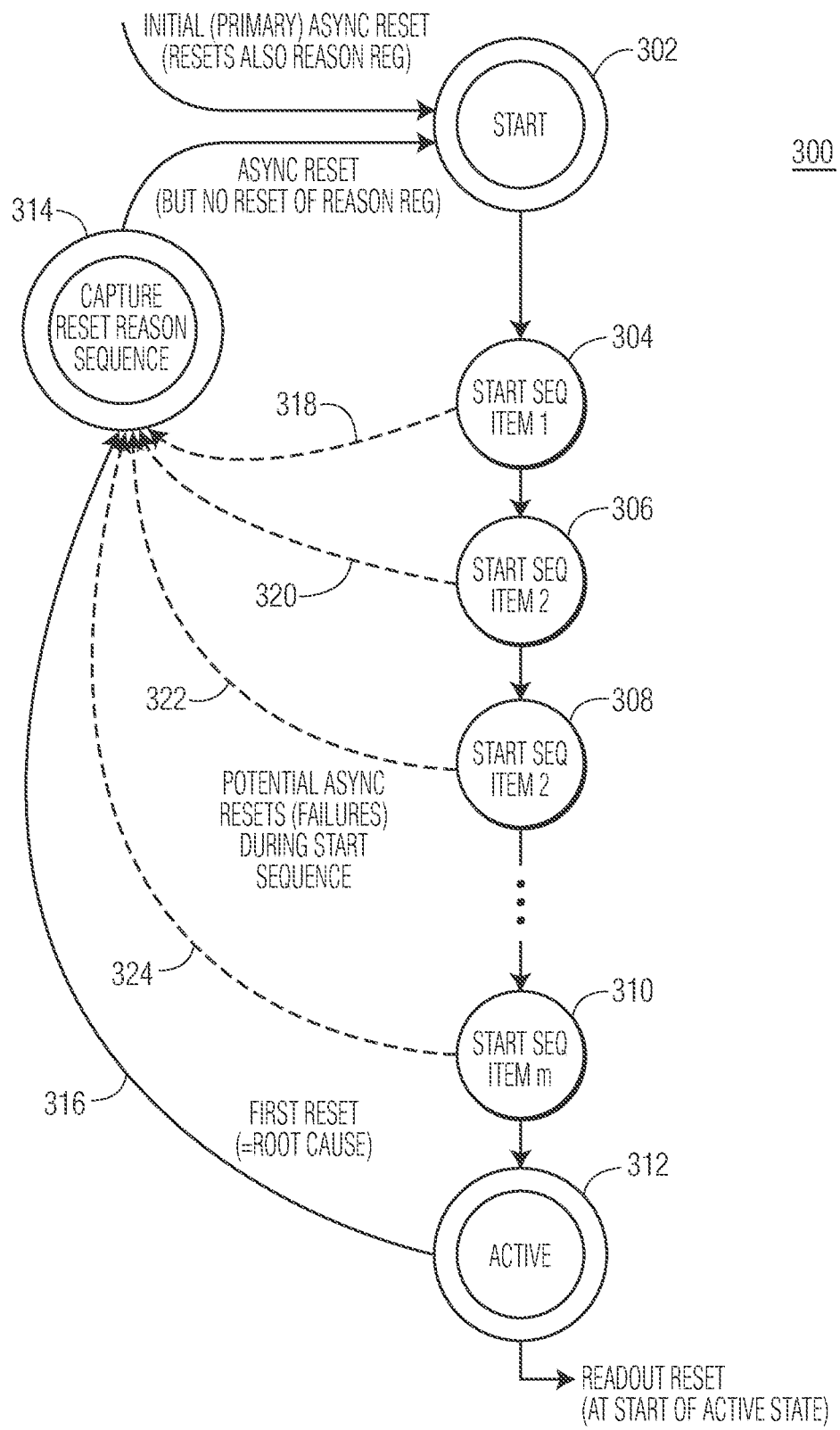
FIG. 3 illustrates, in diagrammatic form, a state machine for a startup procedure, in accordance with one embodiment of the present invention.

FIG. 3 illustrates a state machine (SM) 300 of a system startup procedure in accordance with one embodiment of the present invention. In one embodiment, reset control 134 of system 100 or 200 implements state machine (SM) 300 of FIG. 3. Referring to SM 300 of FIG. 3, an initial (i.e. primary) asynchronous reset is received. This primary reset may refer to the very first power up of system 100, such as the initial reset upon inserting a battery into a battery circuit of system 100. Note that the primary reset also clears all the capture registers (via, e.g., OR gate 128) to zero. In response to the primary reset, SM 300 enters a start state 302 which initiates the startup procedure. The startup procedure includes M start sequences executed in order to finally enter the active state (which corresponds to the normal operating state in which system 100 operates normally). As illustrated in FIG. 3, SM 300 progresses from start state 302, to start sequence item 1 state 304, to start sequence item 2 state 306, to start sequence item 3 state 308, and eventually to start sequence item M state 310 and finally to active state 312. While in active state 312, a first reset caused by a first reason (i.e. the root cause) occurs, which transitions SM 300, via transition 316, to capture reset reasons sequence state 314. An asynchronous reset transitions SM 300 back to start state 302.

Upon entering active state 312, all of the capture registers (e.g. FirstResetReason Captured from 102, Capture2nd from 202, Capture Pth from 222, LastResetReason Captured from 116) can be read out and stored in storage circuitry 138. After the readout is complete, Readout Reset can be asserted which clears all the capture registers via OR gate 128. During each startup procedure, after a first reset reason initiates a startup sequence with start state 302, during the execution of any of the M start sequence items in states 304, 306, 308, . . . , 310, resets of any of the N global resets can be generated. Any of these generated transitions SM 300 back to state 314 (via, e.g., transition 318 from state 304, transition 320 from state 306, transition 322 from state 308, transition 324 from state 310). Each time the state of the N global resets changes during the startup procedure (due to assertion or negation of any of the global resets), the next reset capture register in the set of reset captures registers (e.g. in set 140 or 250) captures the current state of the resets at that point and returns SM 300 back to start state 302. The reset capture registers are not reset upon transitioning back to start state 302 since the current startup procedure is still in process. The reset capture registers are not cleared until the startup procedure completes upon entering active state 312, at which point the reset capture registers are read out and stored. Note that the startup procedure of SM 300 can be any startup procedure including any sequence of operations, as known in the art, depending on the needs of the system. Resets (including asynchronous resets) can be generated for any variety of reasons during any stage of the startup procedure.

Figure 4:
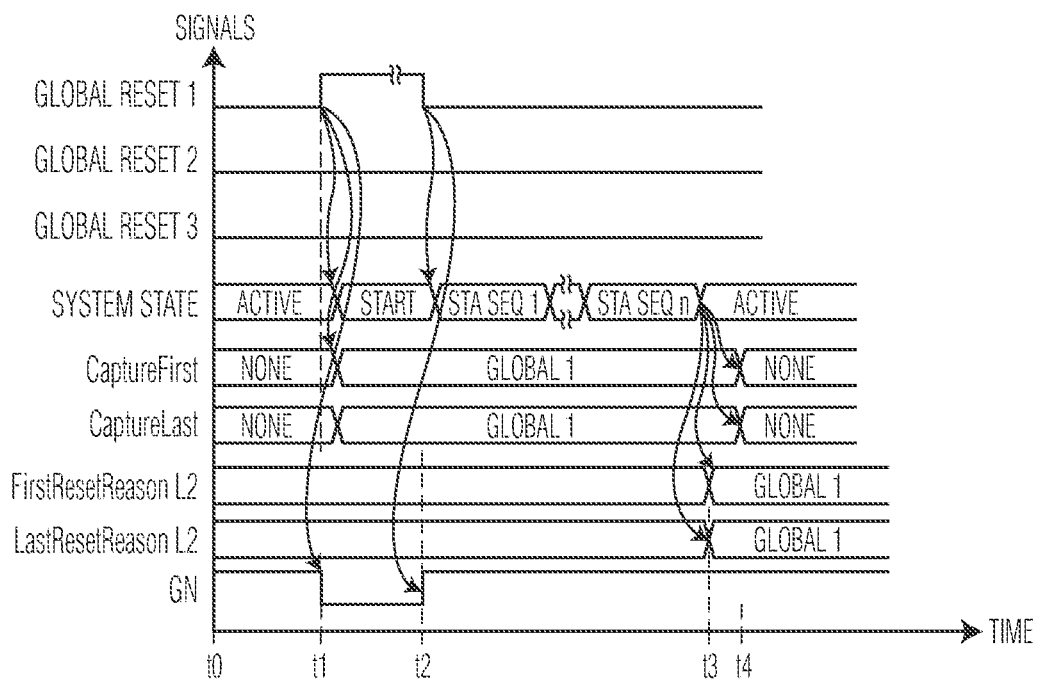
FIGS. 4 and 5 illustrate timing diagrams of various signals within the integrated circuit of FIG. 1 or FIG. 2, in accordance with embodiments of the present invention.
Figure 5:
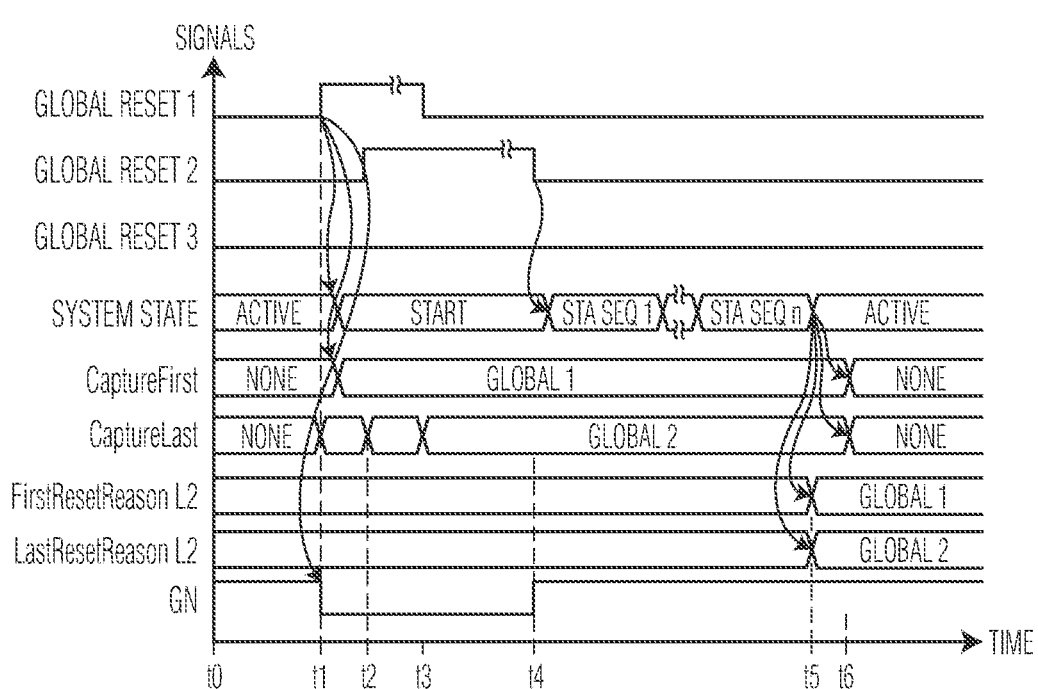

FIGS. 4 and 5 illustrate timing diagrams of various signals of system 100 or system 200. The timing diagrams of FIGS. 4 and 5 can be described either in reference to system 100 or system 200, but for ease of description, will be described in reference to system 100 of FIG. 1. Referring to first to FIG. 4, at time t0, system 100 is in the active state, and it is assumed that everything was already reset with either a primary reset upon power up or a readout reset from a previous startup. Also, the GN signal at the output of NOR gate 130 is a logic level one during the active state (since no global resets are asserted), which switches the latches of CaptureLast register 116 to the non-transparent state.

At time t1, while system 100 is still in the active state, Global Reset 1 is asserted. In response to the assertion of Global Reset 1, SM 300 begins the startup procedure by transitioning from active state 312 to start state 302, as indicated by the "System State" of FIG. 4, and GN transitions to a logic level zero, setting the latches to the transparent state. When Global Reset 1 is asserted, CaptureFirst register 102 "captures" this reset. That is, the output of FF 104, which corresponds to Global Reset 1, is asserted to a logic level one, and in response thereto, CaptureFirst register 102 is locked by the output of NOR gate 114 transitioning to a logic level zero. Therefore, as illustrated in FIG. 4, the value stored in the locked CaptureFirst register 102 indicates Global Reset 1 (since it is the first bit location in FF 104 which is asserted). The state of the N global resets remains steady until Global Reset 1 is negated at time t2. At this point, SM 300 transitions to the next state after the start state (e.g. start sequence item 1 state 304), and GN transitions to a logic level one since none of the N global reset signals are active. At that time, the latches of CaptureLast register 116 capture the last state of the global reset signals at time t2, which, in this example, corresponds to capturing Global Reset 1. The system state continues to transition through the states of SM 300 until entering the active state at time t3.

In this example, no other resets were asserted prior to reaching the active state. Therefore, the value of CaptureLast register 116 remains indicating Global Reset 1 (corresponding to latch 118 storing a logic level one), which is the last reset which occurs before the system state enters the active state again at time t3. Upon entering the active state, the contents of CaptureFirst register 102 and CaptureLast register 116 are read out and stored in a level 2 (L2) register bank of storage circuitry 138 (e.g. in FirstResetReason L2 and LastResetReason L2, respectively). Each of the stored values is an N-bit value such that the bit location of any asserted bit indicates a particular global reset, which is mapped to a particular reason which caused that reset. For example, Global Reset 1 may be mapped to an over-voltage condition, therefore, if the first bit FirstResetReason L2 is asserted, it is known that the first reason for reset was an over-voltage condition. If a different bit location were asserted, it would be known that the first reason for reset was the error or condition corresponding to the global reset which corresponds to that bit location.

Referring next to FIG. 5, note that the signals at time t0 and t1 are the same as were described in reference to FIG. 4. However, in the example of FIG. 5, at time t2, after assertion of Global Reset 1 but prior to negation of Global Reset 1, Global Reset 2 is asserted. For example, Global Reset 1 may corresponding to an over-voltage condition while Global Reset 2 may correspond to a high temperature condition. Therefore, assertion of Global Reset 1 indicates an over-voltage condition in system 100 has been detected, and the subsequent assertion of Global Reset 2 during the start state indicates that a high temperature condition has also been detected. At time t2, when Global Reset 2 is asserted, the value of CaptureFirst register 102 remains the same, indicating only Global Reset 1, since it is already locked (i.e. it is already full). At time t2, the latches of CaptureLast register 116, which are still transparent, provide outputs of logic level ones for the latches corresponding to Global Resets 1 and 2. SM 300 is still within start state 302. The capture registers remain unchanged until a next change in the state of the N Global Resets occurs, which happens at time t3 with then negation of Global Reset 1.

At time t3, CaptureFirst register 102 remains unchanged, but since Global Reset 1 is negated, the latches of CaptureLast register 116, which are still transparent, now provide an output of a logic level one for the latch corresponding to Global Reset 2, since that is currently the only asserted reset of the N Global Resets. That is, CaptureLast register 116 indicates only Global Reset 2. At time t4 the state of the N Global Resets changes again with the negation of Global Reset 2. Again, CaptureFirst register 102 remains unchanged, but since all of the N Global Resets are inactive at time t4, GN is set to a logic level zero via NOR gate 130, triggering CaptureLast register 116 to capture the last state of the global reset signals, which corresponds to only Global Reset 2. While GN remains at a logic one, the outputs of the latches of CaptureLast register 116 remain latched (and thus unchanged). The startup procedure continues to transition through the states of SM 300 until entering the active state at time t5.

In this example, no other resets were asserted prior to reaching the active state. Therefore, the value of CaptureLast register 116 remains indicating Global Reset 2 (corresponding to latch 119 storing a logic level one and the remaining latches of latches 118-120 storing a logic level zero), which is the last reset which occurs before the system state enters the active state again at time t5. Upon entering the active state, the contents of CaptureFirst register 102 and CaptureLast register 116 are read out and stored in a level 2 (L2) register bank of storage circuitry 138 (e.g. in FirstResetReason L2 and LastResetReason L2, respectively). After the readouts, Readout Reset is asserted to clear all the reset capture registers at time t6. The values stored in FirstResetReason L2 and LastResetReason L2 provide the sequence of reset reasons which occurred during the startup procedure. In this example, the first bit in FirstResetReason L2 is asserted, indicating that first an over-voltage condition occurred, and the second bit in LastResetReason L2 is asserted, indicating that subsequent to the over-voltage condition occurring, a high temperature condition occurred (and that this high temperature condition was the last reason for reset which occurred before reaching the active state). Note that the stored capture values provide the sequence of reset reasons, but not the timing of the reset reasons (such as the actual amount of time between resets).

Figure 6:
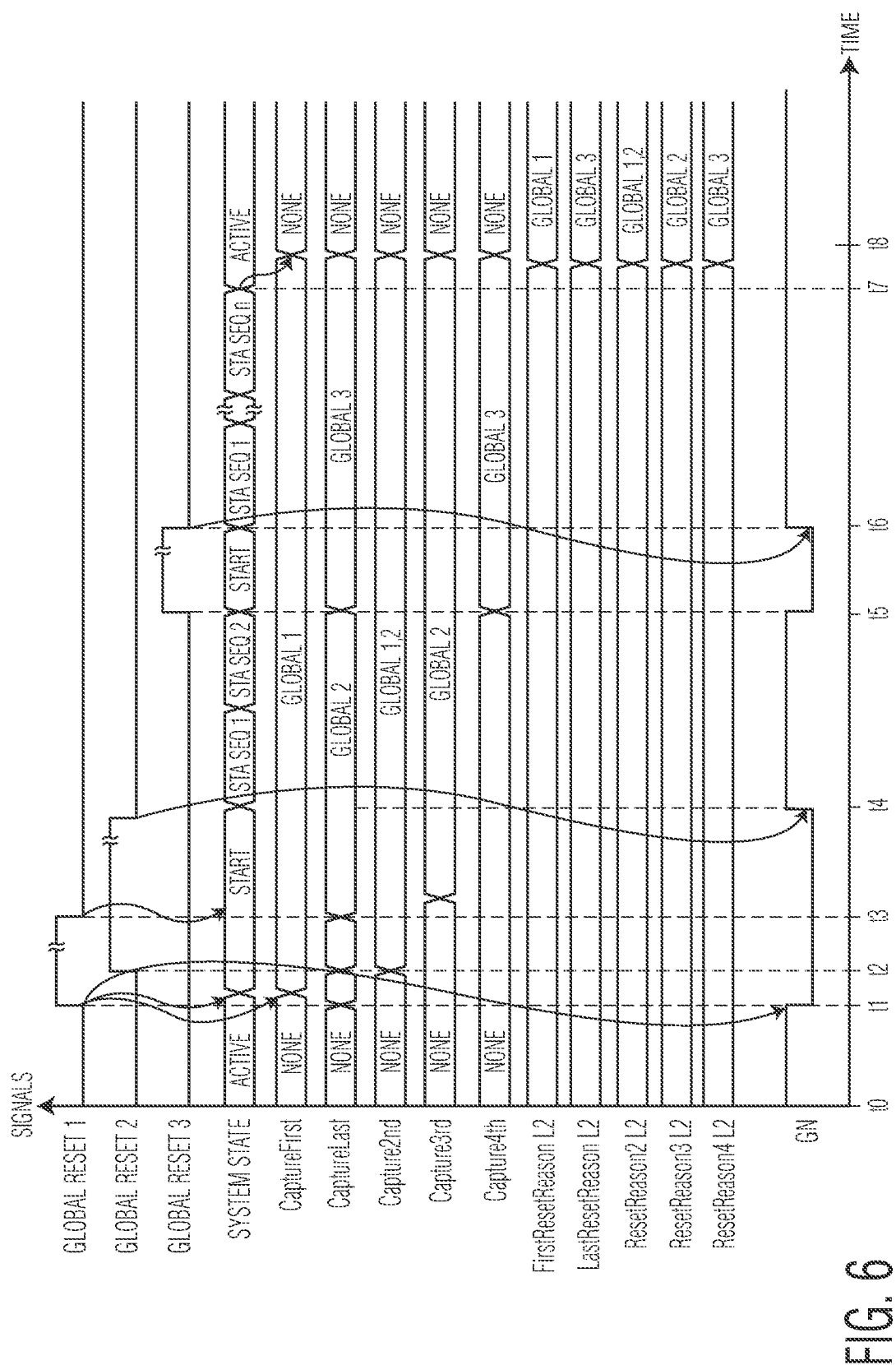
FIG. 6 illustrates a timing diagram of various signals within the integrated circuit of FIG. 2, in accordance with one embodiment of the present invention.

FIG. 6 illustrates a timing diagram of various signals of system 200 (having one or more intermediate reset capture registers). For description of the timing diagram of FIG. 6, it is assumed that system 200 at least includes Capture 2nd register 202, a Capture 3rd register, and a Capture 4th register. For example, Capture Pth register 222 of FIG. 2 may correspond to the Capture 4th register for FIG. 6. Referring to first to FIG. 4, at time t0, system 100 is in the active state, and it is assumed that everything was already reset with either a primary reset upon power up or a readout reset from a previous startup. Also, the GN signal at the output of NOR gate 130 is a logic level one during the active state (since no global resets are asserted), in which the latches of CaptureLast register 116 to operate in the non-transparent state.

The signals and description of the signals with respect to SM 300, CaptureFirst register 102, and CaptureLast register 116 at times t0-t4 which were described in reference to FIG. 5 above also apply to FIG. 6. Note that at time t4, the captured value in CaptureLast register 116 indicates Global Reset 2 since that is the state of the resets just before GN is asserted to a logic level one. However, as will be seen below, Global Reset 2 is not the last reset prior to entering active mode. In addition, when the state of the N global resets changes at time t2 with the assertion of Global Reset 2, the next unlocked reset register (Capture 2nd register 202) captures both the still asserted Global Reset 1 and the newly asserted Global Reset 2. For example, NOR gate 114 indicates to NOR gate 214 that CaptureFirst register 102 is locked. The Global Reset 1 is still unchanged at a logic level one, resulting in the first FF (FF 204) of the Capture 2nd register to output a logic level one, and the newly asserted Global Reset 2 results in the second FF (FF 205) of the Capture 2nd register to also output a logic level one. With the output of digital comparator 238 transitioning to a logic level zero at time t2 (due to the change in the state of Global Reset 2), the output of NOR 214 transitions to a logic level one (a gate delay time after time t2). As one of the Q outputs of FFs 204-206 of Capture2nd register 202 is a logic level one, the output of OR gate 220 also goes to a logic level one, resulting in locking Capture2nd register 202. That is, this output of OR gate 220 is provided to NOR gate 214, whose output therefore transitions to a logic level zero, disabling all the inputs of the locking AND gates (208, 210, 212). This locks the Capture 2nd register as indicating both Global Resets 1 and 2.

When the state of the N Global Resets changes at time t3 with the negation of Global Reset 1, the next unlocked reset capture register, the Capture 3rd register (since the Capture 2nd register was already locked), captures Global Reset 2, which is the only reset which remains asserted at time t3. For example, in one embodiment, OR gate 220 indicates to the Capture 3rd register that the Capture 2nd register is locked. The Capture 3rd register then captures the new state of the global resets in which the FF of the Capture 3rd register corresponding to Global Reset 2 provides a logic level one at its output while the remaining FFs provide logic level 0s. Locking of the Capture 3 rd register is done in the same way as described above for the Capture 2 nd register with OR gate 237, NOR gate 234, and the locking AND gates (228, 230, 232). When locked (a gate delay after time t3), the Capture 3rd register indicates only Global Reset 2. With GN still a logic level zero at time t3 and going back to a logic level one at time t4, CaptureLast register 116 captures Global Reset 2, which is, as of time t4, the last global reset to be asserted prior to completing the startup procedure. However, in the example of FIG. 6, another reset, Global Reset 3 (mapped to a different reset reason, such as, for example, a BIST error), is asserted during the startup procedure.

At time t5, the change in the state of the N Global Resets is detected by the digital comparator of the next reset capture register, the Capture 4th register, in which the output of the digital comparator actives this next reset capture register. Therefore, at time t5, the Capture 4th register captures the new state of the global resets in which the FF of the Capture 4th register corresponding to Global Reset 3 provides a logic level one at its output while the remaining FFs provide logic level 0s. Shortly after time t5 (e.g. a gate delay after t5), the Capture 4th register is now locked as well, indicating only Global Reset 3. With Global Reset 3 asserted, SM 300 returns to start state 302 (without resetting any of the reset capture registers). Also, with Global Reset 3 asserted at time t5, GN is negated to a logic level zero, causing the latches of CaptureLast register 116 to again operate transparently such that the output of CaptureLast register 116 changes to indicate Global Reset 3 rather than Global Reset 2.

At time t6 the state of the N Global Resets changes again with the negation of Global Reset 3. CaptureFirst register 102, as well as the Capture 2nd register, the Capture 3rd register, and the Capture 4th register, all of which are locked, remain unchanged. Since all of the N Global Resets are now negated at time t6, GN is again set to a logic level one via NOR gate 130, triggering CaptureLast register 116 to capture the last state prior to all global reset signals being negated as Global Reset 3. While GN remains at a logic level one, the outputs of the latches of CaptureLast register 116 remain latched (and thus unchanged). The system state continues to transition through the states of SM 300 until entering the active state at time t7.

In this example, no other resets were asserted prior to reaching the active state. Therefore, the value of CaptureLast register 116 remains indicating Global Reset 3, which is the last reset which occurs before the system state enters the active state again at time t7. Upon entering the active state, the N-bit value of each of CaptureFirst register 102, the Capture 2nd register, the Capture 3rd register, the Capture 4th register, and CaptureLast register 116 are read out and stored in the L2 register bank of storage circuitry 138 (e.g. in FirstResetReason L2, ResetReason2 L2, ResetReason3 L2, ResetReason4 L2, and LastResetReason L2, respectively). After the readouts, Readout Reset is asserted to clear all the rest capture registers at time t8.

The values stored in FirstResetReason L2, ResetReason2 L2, ResetReason3 L2, ResetReason4 L2, and LastResetReason L2 provide the sequence of reset reasons which occurred during the startup procedure. In this example, the first bit in FirstResetReason L2 is asserted, indicating that first an over-voltage condition occurred, the first and second bits in ResetReason2 are asserted, indicating that subsequent to the over-voltage condition occurring, the over-voltage condition remained and a high temperature condition occurred. Only the second bit in ResetReason3 is asserted, indicating that subsequent to the over-voltage condition and the high temperature condition, only the high temperature condition remained. Only the third bit in ResetReaston4 is asserted, indicating that subsequent to the high temperature condition, a BIST error occurred. Only the third bit in LastResetReason L2 is asserted as well, indicating that the high temperature condition was the last reason for reset which occurred before reaching the active state). Therefore, the stored capture registers provide the sequence of reset reasons which occurred at each change in state of the N Global Resets during the startup procedure.

By now it should be appreciated how reset capture registers can be used to provide information as to the sequence of the reasons for reset which occur during a startup procedure of a system by capturing the state of the global resets during the startup procedure. In one embodiment, each time the state of the global resets changes, the current state of the resets is captured in a subsequent unlocked reset capture register and that reset capture register is then locked. Since each reset can be mapped to a particular reason (e.g. a condition or error), the sequence of the reasons for reset during startup is known which may provide useful diagnostic information. In one embodiment, an indication of a reason for the last reset which occurs during a startup procedure is also captured. In these embodiments, the reset capture registers operate asynchronously, without the need of a reliable clock, and therefore can be successfully used during startup in which no reliable clock may exist.

The terms "assert" or "set" and "negate" (or "deassert" or "clear") are used herein when referring to the rendering of a signal, status bit, or similar apparatus into its logically true or logically false state, respectively. If the logically true state is a logic level one (i.e. logic level high), the logically false state is a logic level zero (i.e. logic level low). And if the logically true state is a logic level zero, the logically false state is a logic level one.

Each signal described herein may be designed as positive or negative logic, where negative logic can be indicated by a bar over the signal name or an asterisk (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Also for example, in one embodiment, the illustrated elements of system 100 in FIG. 1 or system 200 in FIG. 2 are circuitry located on a single integrated circuit or within a same device. Alternatively, system 100 or system 200, beyond what is illustrated in FIG. 1 or 2, may include additional integrated circuits or devices interconnected with each other.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, the circuitry to lock an asynchronous reset capture register, as described herein, or to capture a state of resets in a subsequent unlocked reset capture register may be designed differently, with more, fewer, or different digital elements (e.g. logic gates) than the embodiments illustrated herein. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

In one embodiment, a system includes a first reset capture register, configured to receive a plurality of reset signals; a last reset capture register, configured to receive the plurality of reset signals; and a reset control circuit configured to perform a startup procedure in response to assertion of a first reset signal of the plurality of rest signals, wherein the startup procedure beings with a start state and ends in an active state in which the system operates in normal operation, and the first reset signal is asserted while the system is in the active state. The first reset capture register is configured to capture a first state of the plurality of reset signals in response to assertion of the first reset signal, and the last reset capture register is configured to capture a final state of the plurality of reset signals prior to completing the startup procedure. In one aspect, the first reset capture register includes a plurality of asynchronous inputs configured to selectively receive the plurality of reset signals, wherein the plurality of reset signals are blocked from the plurality of asynchronous inputs so as not to change an output of the first reset capture register when the first reset capture register is locked. In a further aspect, the plurality of reset signals are provided to the plurality of asynchronous inputs to affect the output of the first reset capture register when the first reset capture register is not locked. In yet a further aspect, during the startup procedure, the last reset capture register is configured to capture the final state of the plurality of asynchronous inputs after the first reset capture register is locked. In another aspect of the one embodiment, the first reset capture register includes a plurality of asynchronous flip flops, each having a set input, wherein the plurality of reset signals are provided to corresponding set inputs of the plurality of asynchronous flip flops when the first reset capture register is unlocked. In a further aspect, the first reset capture register is configured such that assertion of the first reset signal causes assertion of an output of a corresponding asynchronous flip flop of the first rest capture register. In yet a further embodiment, the first rest capture register is configured to be locked in response to the assertion of the output of the corresponding asynchronous flip flop of the first reset capture register. In another aspect, the system further includes a digital portion configured to receive a local reset signal generated by the reset control circuit and including storage circuitry configured to store contents of the first rest capture register and the last reset capture register into the storage circuitry. In another aspect, the digital circuitry is configured to store the contents of the first rest capture register and the last reset capture register into the storage circuitry after completion of the startup procedure. In another aspect, the last reset capture register includes a plurality of gating latches, each having a corresponding gating input, wherein each of the plurality of gating latches is configured to operate transparently when the corresponding gating input is at a first logic state and configured to latch an input value when the corresponding gating input transitions to a second logic state, different from the first logic state. In a further aspect, the gating inputs of the plurality of gating latches are in the second logic state when none of the plurality of reset signals is asserted, and in the first logic state otherwise. In another aspect, each of the plurality of resets is generated in response to a different corresponding reason, wherein each of the different corresponding reasons is a condition or error detected within the system. In another aspect, the system further includes one or more intermediate reset capture registers, wherein an intermediate reset capture register of the one or more intermediate reset capture registers is configured to capture a current state of the plurality of reset signals during the startup procedure when a previous reset capture register is locked and the current state of the plurality of reset signals is different from a captured state of the plurality of reset signals in the previous reset capture register. In a further aspect, the intermediate capture register is configured to be locked in response to capturing the current state of the plurality of reset signals during the startup process such that contents of the intermediate capture register cannot be changed. In another further aspect, each of the one or more intermediate reset capture registers is configured to be locked, in turn, in response to capturing a different state of the plurality of reset signals during the startup procedure. In yet a further aspect, the one or more intermediate reset capture registers are configured to capture a state of the plurality of reset signals each time the state of the plurality of reset signals changes during the startup procedure.

In another embodiment, a system includes a first reset capture register, configured to receive a plurality of reset signals; a last reset capture register, configured to receive the plurality of reset signals; one or more intermediate reset capture registers, each configured to receive the plurality of reset signals; a reset control circuit configured to perform a startup procedure in response to assertion of a first reset signal of the plurality of rest signals, wherein the startup procedure beings with a start state and ends in an active state in which the system operates in normal operation, and the first reset signal is asserted while the system is in the active state; and a digital portion including storage circuitry. The first reset capture register is configured to capture a first state of the plurality of reset signals in response to assertion of the first reset signal; each intermediate reset capture register of the one or more intermediate reset capture registers is configured to capture a current state of the plurality of reset signals during the startup procedure when a previous reset capture register is locked and the current state of the plurality of reset signals is different from a captured state of the plurality of reset signals in the previous reset capture register; and the last reset capture register is configured to capture a final state of the plurality of reset signals prior to completing the startup procedure. The digital portion includes storage circuitry configured to store contents of the first rest capture register, the one or more intermediate registers, and the last reset capture register into the storage circuitry, wherein the reset control circuit is configured to direct the digital portion to store the contents after completion of the startup procedure, and direct reset of each of the first reset capture register, the one or more intermediate reset capture registers, and the last reset capture register after the digital portion stores the contents. In one aspect, a corresponding plurality of asynchronous inputs of each reset capture register of the first reset capture register and of the one or more intermediate reset capture registers is configured to selectively receive the plurality of reset signals, wherein the plurality of reset signals are blocked from the corresponding plurality of asynchronous inputs so as not to change a corresponding output of the reset capture register when the reset capture register is locked. In a further aspect, the plurality of reset signals are provided to the corresponding plurality of asynchronous inputs to affect the corresponding output of the reset capture register when the reset capture register is not locked. In another aspect of the another embodiment, the last reset capture register includes a plurality of gating latches, each having a corresponding gating input, wherein each of the plurality of gating latches is configured to operate transparently when the corresponding gating input is at a first logic state and configured to latch an input value when the corresponding gating input transitions to a second logic state, different from the first logic state.

What is claimed is:

1. A system comprising:
    a first reset capture register, configured to receive a plurality of reset signals;
    a last reset capture register, configured to receive the plurality of reset signals; and
    a reset control circuit configured to perform a startup procedure in response to assertion of a first reset signal of the plurality of rest signals, wherein the startup procedure beings with a start state and ends in an active state in which the system operates in normal operation, and the first reset signal is asserted while the system is in the active state, wherein:
        the first reset capture register is configured to capture a first state of the plurality of reset signals in response to assertion of the first reset signal; and
        the last reset capture register is configured to capture a final state of the plurality of reset signals prior to completing the startup procedure.

2. The system of claim 1, wherein the first reset capture register comprises a plurality of asynchronous inputs configured to selectively receive the plurality of reset signals, wherein the plurality of reset signals are blocked from the plurality of asynchronous inputs so as not to change an output of the first reset capture register when the first reset capture register is locked.

3. The system of claim 2, wherein the plurality of reset signals are provided to the plurality of asynchronous inputs to affect the output of the first reset capture register when the first reset capture register is not locked.

4. The system of claim 3, wherein, during the startup procedure, the last reset capture register is configured to capture the final state of the plurality of asynchronous inputs after the first reset capture register is locked.

5. The system of claim 1, wherein the first reset capture register includes a plurality of asynchronous flip flops, each having a set input, wherein the plurality of reset signals are provided to corresponding set inputs of the plurality of asynchronous flip flops when the first reset capture register is unlocked.

6. The system of claim 5, wherein the first reset capture register is configured such that assertion of the first reset signal causes assertion of an output of a corresponding asynchronous flip flop of the first rest capture register.

7. The system of claim 6, wherein the first rest capture register is configured to be locked in response to the assertion of the output of the corresponding asynchronous flip flop of the first reset capture register.

8. The system of claim 1, further comprising a digital portion configured to receive a local reset signal generated by the reset control circuit and including storage circuitry configured to store contents of the first rest capture register and the last reset capture register into the storage circuitry.

9. The system of claim 1, wherein the digital circuitry is configured to store the contents of the first rest capture register and the last reset capture register into the storage circuitry after completion of the startup procedure.

10. The system of claim 1, wherein the last reset capture register comprises a plurality of gating latches, each having a corresponding gating input, wherein each of the plurality of gating latches is configured to operate transparently when the corresponding gating input is at a first logic state and configured to latch an input value when the corresponding gating input transitions to a second logic state, different from the first logic state.

11. The system of claim 10, wherein the gating inputs of the plurality of gating latches are in the second logic state when none of the plurality of reset signals is asserted, and in the first logic state otherwise.

12. The system of claim 1, wherein each of the plurality of resets is generated in response to a different corresponding reason, wherein each of the different corresponding reasons is a condition or error detected within the system.

13. The system of claim 1, further comprising:
    one or more intermediate reset capture registers, wherein an intermediate reset capture register of the one or more intermediate reset capture registers is configured to capture a current state of the plurality of reset signals during the startup procedure when a previous reset capture register is locked and the current state of the plurality of reset signals is different from a captured state of the plurality of reset signals in the previous reset capture register.

14. The system of claim 13, wherein the intermediate capture register is configured to be locked in response to capturing the current state of the plurality of reset signals during the startup process such that contents of the intermediate capture register cannot be changed.

15. The system of claim 13, wherein each of the one or more intermediate reset capture registers is configured to be locked, in turn, in response to capturing a different state of the plurality of reset signals during the startup procedure.

16. The system of claim 15, wherein the one or more intermediate reset capture registers are configured to capture a state of the plurality of reset signals each time the state of the plurality of reset signals changes during the startup procedure.

17. A system comprising:
a first reset capture register, configured to receive a plurality of reset signals;
a last reset capture register, configured to receive the plurality of reset signals;
one or more intermediate reset capture registers, each configured to receive the plurality of reset signals;
a reset control circuit configured to perform a startup procedure in response to assertion of a first reset signal of the plurality of rest signals, wherein the startup procedure beings with a start state and ends in an active state in which the system operates in normal operation, and the first reset signal is asserted while the system is in the active state, wherein:
the first reset capture register is configured to capture a first state of the plurality of reset signals in response to assertion of the first reset signal;
each intermediate reset capture register of the one or more intermediate reset capture registers is configured to capture a current state of the plurality of reset signals during the startup procedure when a previous reset capture register is locked and the current state of the plurality of reset signals is different from a captured state of the plurality of reset signals in the previous reset capture register; and
the last reset capture register is configured to capture a final state of the plurality of reset signals prior to completing the startup procedure; and
a digital portion including storage circuitry configured to store contents of the first rest capture register, the one or more intermediate registers, and the last reset capture register into the storage circuitry, wherein the reset control circuit is configured to:
direct the digital portion to store the contents after completion of the startup procedure, and direct reset of each of the first reset capture register, the one or more intermediate reset capture registers, and the last reset capture register after the digital portion stores the contents.

18. The system of claim 17, wherein a corresponding plurality of asynchronous inputs of each reset capture register of the first reset capture register and of the one or more intermediate reset capture registers is configured to selectively receive the plurality of reset signals, wherein the plurality of reset signals are blocked from the corresponding plurality of asynchronous inputs so as not to change a corresponding output of the reset capture register when the reset capture register is locked.

19. The system of claim 18, wherein the plurality of reset signals are provided to the corresponding plurality of asynchronous inputs to affect the corresponding output of the reset capture register when the reset capture register is not locked.

20. The system of claim 17, wherein the last reset capture register comprises a plurality of gating latches, each having a corresponding gating input, wherein each of the plurality of gating latches is configured to operate transparently when the corresponding gating input is at a first logic state and configured to latch an input value when the corresponding gating input transitions to a second logic state, different from the first logic state.

* * * * *